United States Patent [19]
Eck

[11] Patent Number: 5,563,776
[45] Date of Patent: Oct. 8, 1996

[54] SWITCHING-MODE, ALTERNATING CURRENT, WAVE REPLICATION SYSTEM

[75] Inventor: E. Joe Eck, Abilene, Kans.

[73] Assignee: Ecktronics Corp., McPherson, Kans.

[21] Appl. No.: 213,243

[22] Filed: Mar. 14, 1994

[51] Int. Cl.$^6$ .................................................. H02M 3/335
[52] U.S. Cl. .................. 363/26; 363/41; 363/98
[58] Field of Search .................. 363/25, 26, 41, 363/98, 132

[56] References Cited

U.S. PATENT DOCUMENTS

| | | | |
|---|---|---|---|
| 4,502,106 | 2/1985 | Glennon | 363/56 |
| 4,580,064 | 4/1986 | Varnovitsky | 307/256 |
| 4,641,232 | 2/1987 | Pitel | 363/98 X |
| 4,779,007 | 10/1988 | Schlanger et al. | 307/66 |
| 4,939,633 | 7/1990 | Rhodes et al. | 363/98 |
| 5,070,251 | 12/1991 | Rhodes et al. | 307/46 |
| 5,155,671 | 10/1992 | Inaba et al. | 363/37 |

Primary Examiner—Peter S. Wong
Assistant Examiner—Y. J. Han
Attorney, Agent, or Firm—Stinson, Mag & Fizzell

[57] ABSTRACT

An inverter/converter power supply system that employs pulse-width modulation controlled by an absolute-value representation of a reference wave. A low-frequency wave, such as a 60 hertz sine wave, is precision-rectified which then is the reference input of a pulse-width modulation controller (PWM). The PWM then produces a high-frequency square-wave signal whose pulse width changes as the amplitude of the rectified reference wave changes. The high-frequency square-wave signal is further rectified at an inverter/converter transformer secondary, whose output is filtered through a low-pass filter that removes the high-frequency component while minimizing the stored charge in the filter capacitor(s) to an amount easily drained by a small constant-current load across it. Feedback from the constant-current load to the PWM further adjusts the pulse-width to compensate for load variations and circuit losses. A flip-flop matrix of transistors then converts the pulsating DC wave signal to an AC wave signal by inverting the polarity on every other half wave cycle.

13 Claims, 2 Drawing Sheets

5,563,776

SWITCHING-MODE, ALTERNATING CURRENT, WAVE REPLICATION SYSTEM

FIELD OF THE INVENTION

This invention relates to alternating current wave replication systems, and in particular, to a switching-mode, alternating wave replication system geared toward, but not limited to, power inverter/converter applications.

BACKGROUND OF THE INVENTION

Conventional circuitry employed for power inverter/ converters include a monolithic pulse-width modulator (PWM) integrated circuit that drive a push-pull pair of mosfet transistors which alternately pulse a high-current DC power source into the primary of a ferrite transformer at a high switching frequency. The transformer output is rectified with a full-wave bridge of ultra-fast rectifiers. A PWM typically looks for a steady DC reference voltage at its input to emulate that particular waveshape.

Prior applications have either designed an inverter/ converter using a PWM to eliminate the DC component of a high switching frequency wave signal, or require more than one DC voltage source to obtain a multi-phase AC power signal. For example, the Rhodes et al. U.S. Pat. No. 4,939,633 is directed to an inverter power supply system that includes a PWM circuit design that can eliminate the DC component from the high frequency AC component from the output waveform to produce a 60 hertz/120 volt AC output. This design is limited, however, to replicating a waveform that cannot include a DC component. Further, the Rhodes et al. '633 circuit would require a heavier and larger transformer to raise or lower the voltage than one operating at a switching frequency of 100 kilohertz.

Another example is the Glennon U.S. Pat. No. 4,502,106, which is directed to a circuit using a PWM to obtain a multi-phase AC power signal. This circuit requires the use of two DC voltage sources and lacks the ability to send a feedback signal to increase or decrease the voltage at the PWM to adjust the pulse width of the DC power source in response to the feedback signal.

It has been discovered in accordance with the invention described below that instead of just relying on a stable DC reference voltage on the PWM, a precision-rectified, low voltage sample of a desired wave-shape source can be used as a controlling signal to adjust the PWM to replicate any desired wave-shape. By selecting complimentary filter components after rectification at the output of the secondary of the transformer, the PWM can adjust to any rapidly-changing wave-shape.

OBJECTS OF THE PRESENT INVENTION

Accordingly, it is the primary object of the present invention to provide a switching-mode, alternating current, wave replication system.

It is another object of the invention to provide a switching-mode, alternating current, wave replication system wherein a rectifier for converting a low-frequency, low-voltage AC reference signal into a low-frequency, low-voltage DC signal is transmitted to a pulse-width modulator for varying the pulse-width of a DC power source into a pulsed high switching frequency DC power signal which is transformed into a high-frequency high-voltage AC power signal and rectified into a high-frequency high-voltage DC power signal that is converted into a low-frequency high-voltage AC signal having a wave-shape substantially replicating the wave-shape of the low-frequency low-voltage AC reference signal; to provide such a wave replication system wherein the rectified and filtered high-frequency high-voltage DC power signal is used as a feedback signal to adjust the PWM to compensate for circuit losses and load variations; to provide such a wave replication system wherein a second-order low-pass filter is used to filter the high-frequency high-voltage DC power signal into a filtered DC signal which is transmitted to a matrix of high-voltage transistors for converting the filtered DC signal into the low-frequency, high-voltage AC signal; and to provide such a wave replication system which is relatively inexpensive, efficient in use and well adapted to replicate the wave-shape of any low-frequency low-voltage AC reference signal.

Other objects and advantages of this invention will become apparent from the following description taken in connection with the accompanying drawings wherein are set forth, by way of illustration and example, certain embodiments of this invention.

DESCRIPTION OF THE PREFERRED EMBODIMENT

Figure 1:
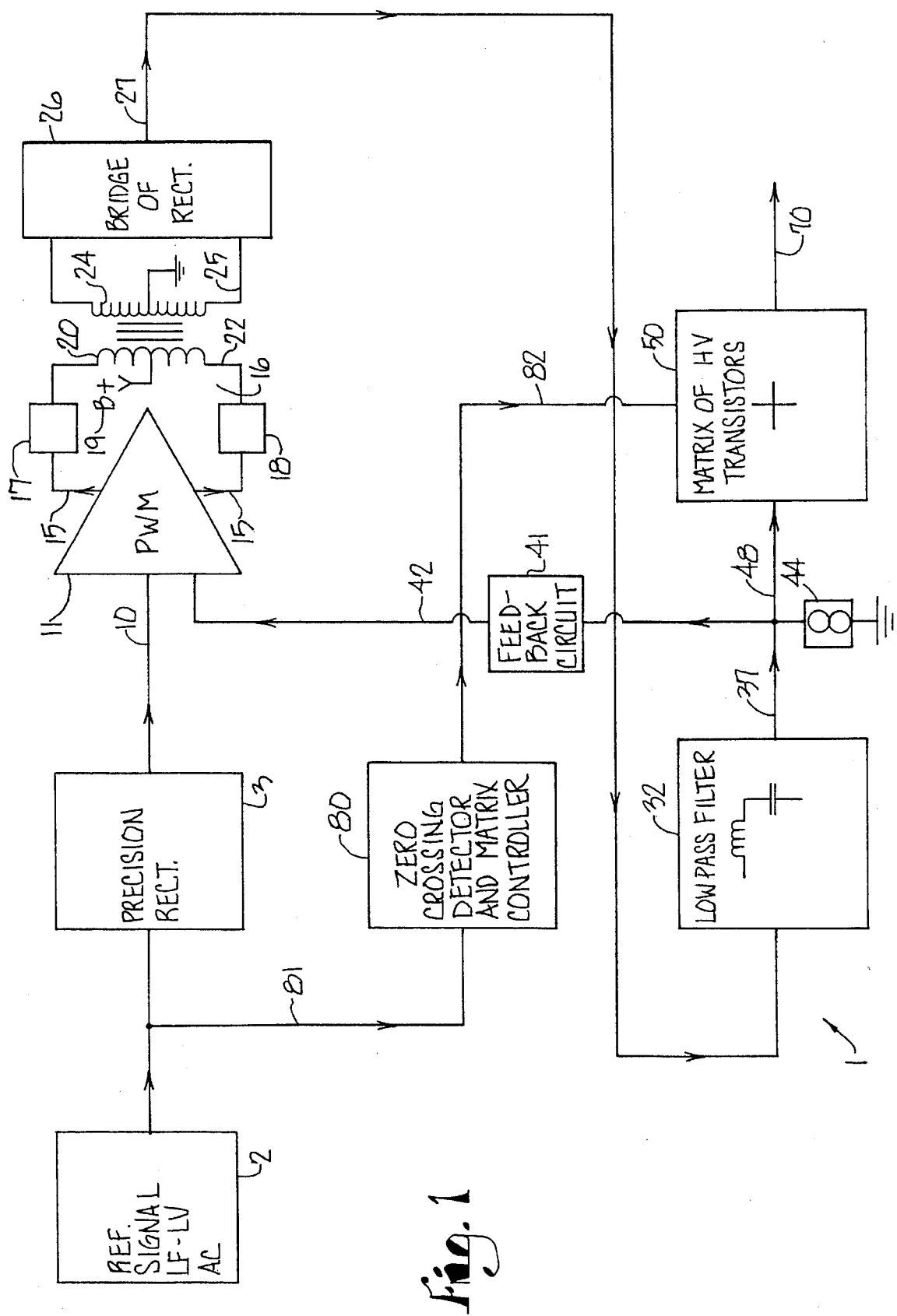
FIG. 1 is a diagram, partially in block and partially in schematic form, showing a switching-mode, alternating current, wave replication system.

Referring to FIG. 1, there is illustrated a switching mode, alternating current, wave replication system 1 geared toward, but not limited to, power inverter/converter applications. The system 1 converts low-frequency low-voltage (LF–LV) AC reference signal 2 through the use of a precision rectifier 3, which converts the reference signal 2 into a low-frequency low-voltage (LF–LV) DC signal 10. The DC signal 10 is received by a pulse-width modulator 11 (PWM) which transmits a varying pulse-width square-wave HF–LV DC drive signal 15 into a push-pull pair of power mosfet transistors 17 and 18. The transistors 17 and 18 alternately pulse a low-voltage high current DC power source 19, such as from a battery, through the primary 21 of a ferrite transformer 20 into a pulsed high switching frequency DC signal 22, such as 100 kilohertz. The secondary 24 of the transformer 20 produces a high switching frequency high-voltage (HF–HV) AC signal 25 which is transmitted to a full-wave bridge of ultra-fast rectifiers 26, which produce a HF–HV DC signal 27. The rectifiers 26 are connected to a low-pass filter 32. The HF–HV DC signal 27 from the rectifier 26 is sent to the low-pass filter 32.

The low-pass filter 32 is connected to a feedback circuit 41, a high voltage constant-current circuit 44, and a matrix of high voltage transistors 50. The low-pass filter 32 minimizes a stored charge in its capacitors and produces a filtered DC signal 37 that is now a LF–HV DC signal, and which is sent to the feedback circuit 41 and to the constant-current circuit 44.

The feedback circuit 41 sends a feedback signal 42 to the PWM 11, which allows the PWM 11 to adjust the pulse width of the square-wave HF–LV DC drive signal 15 driving the transistors 17 and 18 in response to load variations sensed at a high-voltage flip-flop matrix 50 to recreate the wave shape of the reference signal 2.

The constant-current circuit 44 drains the excess stored charge from the capacitors in the filter 32 and sends a filtered DC signal 48, which is still a LF–HV DC signal, to the matrix 50. The matrix 50 is connected to a zero crossing detector and matrix controller 80.

The controller 80 is electrically connected to receive the reference signal 2 through connections 81. The controller 80 detects when the wave shape of the reference signal 2 is above or below a zero voltage value and sends control signals 82 to the matrix 50. The matrix 50 recreates the positive and negative wave-shape of the reference signal 2 in response to the control signals 82 and the filtered DC signal 48. The matrix 50 converts the filtered DC signal 48 (LF–HV DC signal) into a low-frequency high-voltage (LF–HV) AC power signal 70 having a wave-shape substantially replicating the wave-shape of the reference signal 2.

Figure 2:
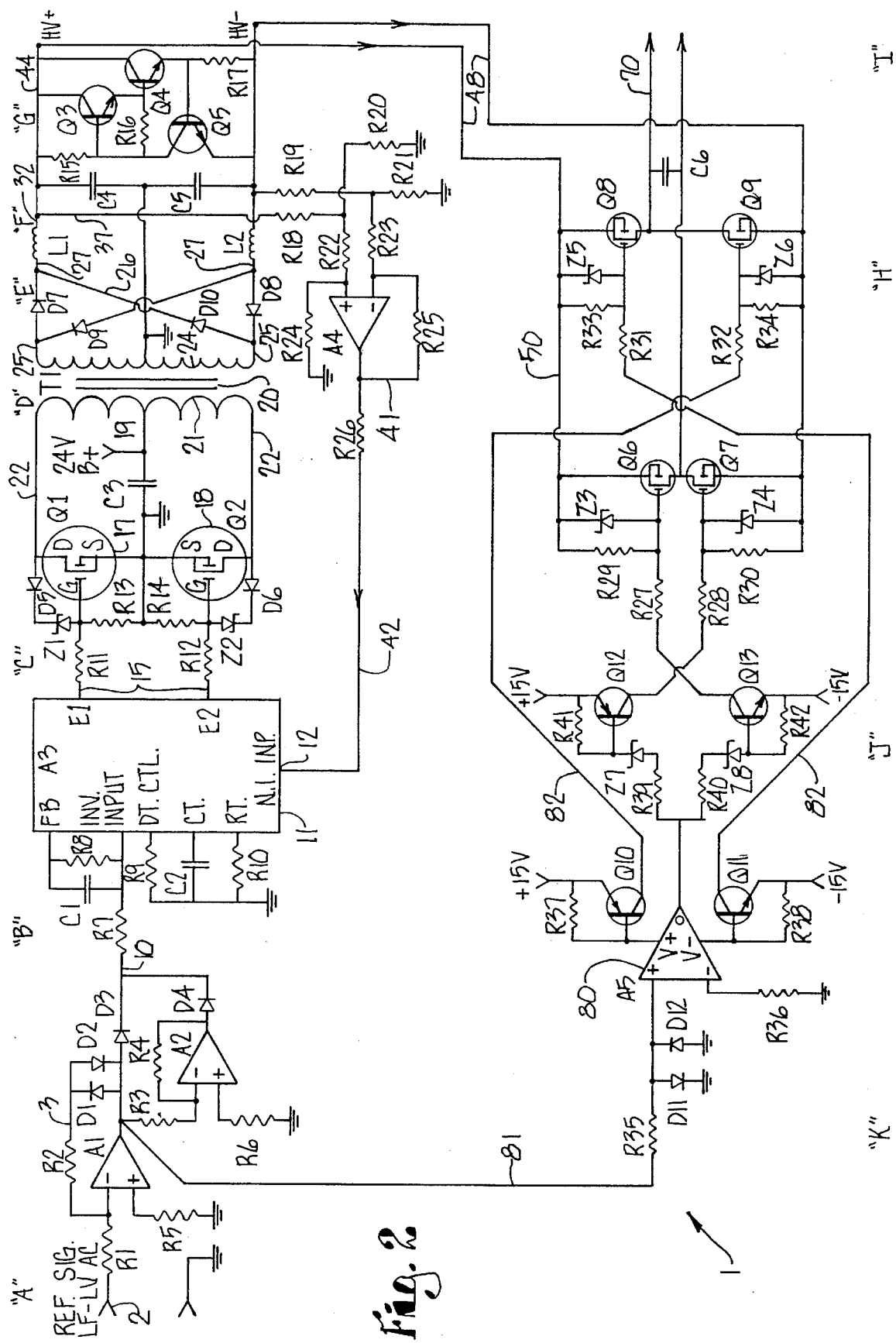
FIG. 2 is a schematic drawing illustrating the reference signal rectifier, the pulse-width modulator, the transformer, the bridge rectifier, the second-order low-pass filter, the feedback circuit, the constant current load, the matrix of high-voltage transistors and the DC power source shown in block diagram form in FIG. 1.

Referring now to FIG. 2, there is illustrated in greater detail the switching-mode alternating current wave replication system 1 shown in FIG. 1. The reference signal 2, such as a 60 hertz 6-volt peak-to-peak signal, whose waveform is to be replicated, is presented at point "A". The reference signal 2 is connected to the precision rectifier 3, which includes operational amplifiers A1 and A2, such as National LF353 amplifiers, silicon diodes D1–D4 and resistors R1–R6. The silicon diodes D1–D4, are typical switching diodes such as an IN4148. The resistors R1–R4 are 4.7K ohm resistors, and the resistors R5–R6 are 2.7K ohm resistors. The output of the precision rectifier 3 is a LF–LV DC signal 10, such as 120 hertz and 3 volts peak DC.

The precision rectifier 3 is connected to the PWM 11, such as a Texas Instrument TL 494. The PWM 11 receives the absolute value of the LF–LV DC signal 10 at point "B" through resistor RT, which has a value of 4.7K ohms. The PWM 11 includes connections to a capacitor C1 of $0.001\mu$ farad and a resistor R8 of 680K ohms that control the gain and cutoff frequency of the internal error-amplifier in the PWM 11. Also, the PWM 11 is connected to capacitor C2 of $0.002\mu$ farad and a resistor R10 of 2.5K ohms which set the internal oscillator frequency of the PWM 11 to approximately 100 KHZ, while the resistor R9 of 12K ohms sets the dead-time in the push-pull outlets at E1 and E2 to approximately five percent (5%). The PWM 11 also receives the feedback signal 42 at the N.I. input pin 12. As the LF–LV DC signal 10 varies in amplitude, the PWM 11 varies the width of the output pulse of the square wave HF–LV DC drive signal 15. The pulse (not shown) gets wider as a higher voltage is received by the PWM 11.

The output of the PWM 11 is the varying pulse-width square-wave HF–LV DC drive signal 15 which is presented at point "C" and goes through resistors R11 and R12, both being of 22 ohms, to the gates of a pair of push-pull mosfet transistors 17 and 18, also shown as Q1 and Q2 and which are 100 volt IRF150 N-Channel Power Mosfets. The mosfet transistors 17 and 18 include pull-down resistors R13 and R14, both of 120 ohms, zener-diode combinations Z1–D5 and Z2–D6 which provide over-voltage protection for the mosfet transistors 17 and 18 by stopping transient signals when the zener voltage of 75 volts is exceeded. The diodes D5 and D6 are typical Motorola MUR110 ultra-fast rectifiers.

The mosfet transistors 17 and 18, which are connected to the ferrite transformer 20, also shown as T1, use the pulse square-wave HF–LV DC drive signal 15 to pulse the 24 volts DC power source 19, such as from a battery, through the primary 21 of the transformer 20. The LV source 19 is bypassed by a $10\mu$ farad polypropylene capacitor C3, which is in the primary center-tap of the transformer 20, as the transistors 17 and 18 respond to the pulse square-wave HF–LV DC drive signal 15 from the PWM 11.

The transformer 20 at point "D", has 3-CT-3 turns of half-inch braid on the primary 21 and 16-CT-16 turns of No. 20 insulated solid wire on the secondary 24. When the mosfet transistors 17 and 18 pulse the DC power source 19 through the primary 21 of the ferrite transformer 20, a HF–LV DC signal 22, such as 100 kilohertz, is produced. In turn, the secondary 24 produces a HF–HV AC signal 25. The secondary 24 of the ferrite transformer 20 is connected to a full wave bridge of ultrafast diode rectifiers 26, shown as D7–D10, and are Motorola MUR860's.

The diode rectifiers 26 rectify the HF–HVAC signal 25 into a HF–HV DC signal 27 at point "E". The HF–HV DC signal 27 then is filtered by a second-order low-pass filter 32 at point "F". The low-pass filter 32 has inductors L1 and L2, and capacitors C4 and C5. In the present embodiment, the inductors L1 and L2 produce the maximum power and stability at 20 microhenries each. The capacitors C4 and C5 are $2\mu$ farad capacitors and are typical high-voltage mylar capacitors. The present embodiment has an inductance to capacitance ratio for the second-order low-pass filter 32 of approximately 10, which is higher than other more conventional inverter/converter filters.

The PWM 11 typically looks for a steady DC reference voltage at its input to emulate. With the system 1, the absolute value of an inputed, LF–LV AC reference signal 2 guides the PWM 11, forcing the pulse width to vary as the amplitude of the LF–LV AC reference signal 2 varies. This absolute value is derived through the use of the precision rectifier circuit 3. The low-pass filter 32 maximizes the attenuation of the switching carrier frequency, in this case the HF–HV DC signal 27, and minimizes the attenuation of the modulating LF–LV DC signal 10. The low-pass filter 32 also minimizes the stored charge in the shunt filter capacitance made by the capacitors C4 and C5.

The low-pass filter 32 at point "F" sends a sample of the filtered DC signal 37, which is now a LF–HV DC signal, to the feedback circuit 41. The feedback circuit 41 includes resistors R18–R26 and an amplifier A4, and is connected to the PWM 11 at the N.I. input pin 12. The sample filtered DC signal 37 is attenuated through R18 and R19 (both of 10K ohms), and R20 and R21 (both of 390 ohms). The amplifier A4, which is a typical National LM308, and the resistors R22–R25 (all rated at 47K ohms), provide a differential feedback signal 42 through R26 (4.7K ohms) to the PWM 11. The feedback signal 42 allows the PWM 11 to adjust the pulse width of the LF–LV DC signal 10 in response to the feedback signal 42 from the feedback circuit 41.

The filtered DC signal 37 is also transmitted to the constant-current circuit 44 presented at point "G" that uses high-voltage bipolar transistors Q3 and Q4, which are Nutone NTE287 and Motorola MJE5740 respectively, and a low-voltage bipolar transistor Q5, a 2N2222, along with resistors R15–R16 (both 27K ohms) and R17 (5 ohms), to satisfactorily drain the capacitance stored charge in the filtered DC signal 37 for adequately tracking an inverter wave of 120 volts root means square. Since a capacitor would charge to near the peak value of a rectified voltage source, a small stored charge can be more readily drained off.

In the present embodiment, the 120 volt root means square sine wave has a peak theoretical negative slew rate of 0.064 volts per microsecond. With a net shunt capacitance of one microfarad, a minimum load of 64 milliamps will produce a negative slew of approximately 0.064 volts per microsecond, as determined by the formula below for approximating the peak slew rate of a 120 volt root-mean-square sine wave.

Since peak slew rate of a sine wave is near the zero-crossing point, a close approximation can be made looking at $\Delta V/\Delta T$ for the interval between 1° and 0° of the wave.

$$\frac{(\sin 1° - \sin 0°) \times \sqrt{2} \times 120}{4.6296 \times 10^{-5} \text{ (Time for 1°)}} = \frac{2.9613}{.000046296}$$

$$= 63965 \text{ volts per second}$$

$$= .064 \text{ volts per micro second}$$

Therefore, the low-pass filter 32 minimizes the stored charge, while the constant-current circuit 44 drains the stored charge. In converter applications where the desired AC output is a lower root-mean square voltage, a precision low voltage constant-current circuit can be used. Further, a gated version of this circuit can also be fashioned to conduct only on the negative-going slope to improve efficiency.

Referring again to FIG. 2, the constant-current circuit 44 produces a drained filtered DC signal 48; which is still a LF–HVDC signal, and is transmitted to the matrix of high voltage transistors 50, presented at point "H". The matrix 50 in the present embodiment is comprised of four high-voltage mosfet transistors Q6–Q9, resistors R27–R34 (all 33K ohms), zener diodes Z3–Z6 (all 6.8 volt) and a capacitor C6, which is rated at 0.1μ farad at 250 volts, all of which are configured to convert the output polarity at Point "I" from DC to AC. The matrix 50 is connected to the zero-crossing detector and matrix controller 80, which sends control signals 82 to the matrix 50 when the controller 80 detects the reference signal 2 transmitted through connections 81 crosses the zero-voltage axis. The control signals 82 alternately actuate at least two of the four transistors Q6–Q9 such that the matrix 50 alternately inverts the polarity and works to replicate the wave shape of the reference signal 2 in the output LF–HV AC signal 70.

The transistors Q6–Q9 in the matrix 50 offer low drive requirements, and they are inherently resistive in nature, inducing a minimum of distortion to the output wave shape. The capacitor C6 is added to the output of the matrix 50 to help stabilize the circuit under load, requiring only a slight increase in the minimum constant-current circuit load. The capacitor C6 also helps to mitigate minor transients generated as the matrix 50 reverses output polarity.

The controller 80 provides zero crossing detection and actuates a matrix of high voltage bipolar transistors Q10–Q13, presented at point "J", which drives the matrix 50. The transistors Q10–Q12 are both Nutone NTE 288s, and transistors Q11–Q13 are NTE 287s. The controller 80 also includes resistors R37–R38 (both 1K ohm), and zener diodes Z7–Z8 (both 20 volt). These components of the controller 80 are actuated by the zero-crossing detector amplifier A5, along with the resistors R35–R36 (both 100K ohms) and limiting diodes D11–D12 (both IN4148), when they detect the polarity of the reference signal 2 as the wave is crossing the zero-voltage axis.

Thus, the output signal of the matrix 50 is a LF–HV AC signal 70 that has a wave-shape substantially replicating the wave-shape of the low-frequency low-voltage AC signal 2. With the system 1, a low-frequency AC wave of almost any shape, sine, triangular, complex, even asymmetrical, can be replicated so long as the peak negative slew of the wave of the filtered DC signal 37 is matched, and the switching carrier frequency is sufficiently higher than the frequency of the LF–LV reference signal 2 and any of its harmonics.

In summary, the configuration of significance is that, an LF–LV AC reference signal 2, such as a 60 hertz/6 volt peak to peak signal, is precision-rectified into a LF–LV DC signal 10 that is the input of a PWM 11. The PWM 11 produces a pulse-width square-wave HF–LV DC drive signal 15 whose width varies as the amplitude of the rectified LF–LV DC signal 10 wave changes. The square-wave HF–LV DC drive signal 15 is increased through a transformer 20, which produces an HF–HV AC signal 25. This HF–HV AC signal 25 is further rectified through a bridge of rectifiers, whose output is a HF–HV DC signal 27. A second-order low-pass filter 32 filters the HF–HV DC signal 27 into a filtered LF-HV DC signal 37.

A constant-current load 44 drains any excess stored charge in the LF–HV DC signal 27 and provides a feedback signal 42 to the PWM 11 through a feedback circuit 41. The feedback signal 42 allows the PWM 11 to adjust the pulse-width of the square-wave HF–LV DC drive signal 15 for load variation and circuit losses.

A matrix of high-voltage transistors 50 then receives the LF–HV DC signal 48 and alternately inverts the polarity from DC to AC. The matrix 50 is controlled by a zero-crossing detector and matrix controller 80, which receives as an input signal the reference signal 2 to allow the controller 80 to detect when the wave-shape of the reference signal 2 is above or below a zero-voltage value. The controller 80 sends control signals 82 to the matrix 50 to recreate the positive and negative wave-shape of the reference signal 2. Thus, the matrix 50 alternately inverts the polarity of the LF–HV DC signal 48 into an LF–HVAC signal 70 that has a wave-shape substantially replicating the wave-shape of the reference signal 2.

It is to be understood that while certain forms of this invention have been illustrated and described, the invention is not limited thereto, except insofar as such limitations are included in the following claims.

What is claimed and described to be secured by Letters Patent is as follows:

1. A switching-mode AC wave replication system comprising:

(a) a rectifier for converting a low-frequency, low-voltage AC reference signal applied thereto into a low-voltage DC signal and transmitting said low-voltage DC Signal into a pulse-width modulator and a zero crossing detector and matrix controller;

(b) said pulse-width modulator for varying the pulse-width of a DC power source into a pulsed DC signal and transmitting said pulsed DC signal into a transformer;

(c) said transformer converting said pulsed DC signal into a high-frequency, high-voltage AC signal, and transmitting said high-frequency, high-voltage AC signal into a full-wave bridge rectifier;

(d) said bridge rectifier converting said high-frequency, high-voltage AC signal into a high-voltage DC signal, and transmitting said high-voltage DC signal to a filter;

(e) said filter converting said high-voltage DC signal into a filtered high-voltage DC signal and transmitting said filtered high-voltage DC signal to a feedback circuit, a constant-current load;, and to a matrix of high-voltage transistors;

(f) said feedback circuit transmitting said filtered high-voltage DC signal back to said pulse-width modulator;

(g) said pulse-width modulator adjusting the pulse width of said dc power source in response to said low-voltage DC signal from said rectifier and said filtered high-voltage DC signal from said feedback circuit;

(h) said matrix having connections with said zero crossing detector and matrix controller and converting said filtered high-voltage DC signal into a low-frequency, high-voltage AC signal having a wave-shape substantially replicating the wave-shape of said reference signal; and (I) said controller having connections for receiving said reference signal and means for detecting when said wave-shape of said reference signal is above and below a zero value, and sending control signals to said matrix in response to said detection means.

2. A switching-mode AC wave replication system as set forth in claim 1, wherein said filter minimizes a small stored charge in said filtered high-voltage DC signal.

3. A switching-mode AC wave replication system as set forth in claim 1, wherein said constant-current load drains said small stored charge from said filtered high-voltage DC signal.

4. A switching-mode AC wave replication system as set forth in claim 1, wherein said matrix has at least four high-voltage transistors to recreate said wave-shape of said reference signal.

5. A switching-mode AC wave replication system as set forth in claim 4, wherein said controller alternatively sends said controls signals to at least two of said four transistors of said matrix to recreate the positive and negative wave-shape of said reference signal in response to said control signals and said filtered high-voltage DC signals.

6. A switching-mode AC wave replication system comprising:

(a) a precision rectifier for converting a low-frequency low-voltage AC reference signal applied thereto into a low-voltage DC signal and transmitting said low-voltage DC signal into a pulse-width modulator and a zero crossing detector and matrix controller;

(b) said pulse-width modulator for varying the pulse-width of a DC power source into a pulsed DC signal and transmitting said pulsed DC signal into a transformer;

(c) said transformer converting said pulsed DC signal into a high-frequency, high-voltage AC signal, and transmitting said high-frequency, high-voltage AC signal into an ultra-fast full-wave bridge rectifier;

(d) said bridge rectifier converting said high-frequency, high-voltage AC signal into a high-voltage DC signal, and transmitting said high-voltage DC signal into a second-order low-pass filter;

(e) said filter minimizing a stored charge in said high-voltage DC signal and producing a filtered high-voltage DC signal, and transmitting said filtered high-voltage DC signal to a feedback circuit, a constant-current load, and to a matrix of high-voltage transistors;

(f) said feedback circuit transmitting said filtered high-voltage DC signal back to said pulse-width modulator;

(g) said pulse-width modulator adjusting the pulse width of said DC-power source in response to said low-voltage DC signal from said precision rectifier and said filtered high-voltage DC signal from said feedback circuit;

(h) said constant-current load draining said stored charge from said filtered high-voltage DC signal before said matrix receives said filtered high-voltage DC signal;

(i) said matrix having connections with said zero crossing detector and matrix controller and having at least four high-voltage transistors for converting said drained filtered high-voltage DC signal into a low-frequency, high-voltage AC signal having a wave with a shape substantially replicating the wave shape produced by said reference signal; and (j) said controller having connections for receiving said reference signal and means for detecting when said wave shape of said reference signal is above and below a zero value, and sending control signals to said matrix in response to said detection means.

7. A switching-mode AC wave replication system as set forth in claim 6, wherein said controller has means for alternately transmitting said control signals to at least two of said transistors of said matrix to recreate the positive and negative wave shape of said reference signal in response to said control signals and said drained filtered high voltage DC signal.

8. A switching-mode AC wave replication system comprising:

(a) a precision rectifier for converting a low-frequency low-voltage AC reference signal applied thereto into a low-voltage DC signal which is produced as an output thereof;

(b) a pulse-width modulator for varying the pulse-width of a DC power source into a pulsed DC signal and transmitting said pulsed DC signal into a transformer;

(c) said transformer converting said pulsed DC signal into a high-frequency, high-voltage AC signal, and transmitting said high-frequency, high-voltage AC signal into an ultra-fast full-wave bridge rectifier;

(d) said bridge rectifier converting said high-frequency, high-voltage AC signal into a high-voltage DC signal, and transmitting said high-voltage DC signal into a second-order low-pass filter;

(e) said filter minimizing a stored charge in said high-voltage DC signal and producing a filtered high-voltage DC signal, and transmitting said filtered high-voltage DC signal to a feedback circuit, a constant-current load, and a matrix of four high-voltage transistors;

(f) said feedback circuit transmitting said filtered high-voltage DC signal back to said pulse-width modulator;

(g) said constant-current load draining said stored charge from said filtered high-voltage DC signal before said matrix receives said filtered high-voltage DC signal;

(h) said pulse-width modulator adjusting the pulse width of said DC power source in response to said low-voltage DC signal from said precision rectifier and said filtered high-voltage DC signal from said feedback circuit;

(i) said transistors of said matrix converting said drained filtered high-voltage DC signal into a low-frequency, high-voltage (LF–HV) AC signal having a wave with a shape substantially replicating the wave shape produced by said reference signal, and having connections with a zero-crossing detector and matrix controller; and (j) said controller having connections with said reference signal and means for detecting when said wave shape of said reference signal is above and below a zero value and alternately transmitting control signals to at least two of said transistors of said matrix to recreate the positive and negative wave shape of said reference signal in response to said detection means and said drained filtered high-voltage DC signal.

9. A switching-mode AC wave replication system as set forth in claim 8, wherein said filter has a high inductance to capacitance ratio.

10. A switching-mode AC wave replication system as set forth in claim 8, wherein said pulsed DC signal from said pulse-width modulator has a high switching frequency that remains approximately constant while said pulse width varies as the amplitude of said low-voltage DC signal from said precision rectifier varies.

11. A switching-mode AC wave replication system as set forth in claim 8, wherein said matrix alternately inverts the wave shape of said low-frequency, high-voltage AC signal in response to said wave shape of said low-voltage DC signal from said precision rectifier crossing the zero axis.

12. A method for replicating a wave shape comprising the steps of:

(a) converting a low-frequency, low-voltage AC reference signal into a low-voltage DC signal;

(b) transmitting said low-voltage DC signal into a pulse-width modulator, said pulse-width modulator varying the pulse-width of a DC power source into a pulsed DC signal;

(c) transmitting said pulsed DC signal into a transformer, said transformer converting said pulsed DC signal into a high-frequency, high-voltage AC signal;

(d) transmitting said high-frequency, high-voltage AC signal into ultra-fast diode rectifiers for converting said high-frequency, high-voltage signal into a high-voltage DC signal;

(e) transmitting said high-voltage DC signal into a filter, said filter converting said high-voltage DC signal into a filtered high-voltage DC signal said filter minimizing a small stored charge in said high-voltage DC signal; and (f) transmitting said filtered high-voltage DC signal into a feedback circuit, said feedback circuit transmitting said filtered high-voltage DC signal back to said pulse-width modulator, said pulse-width modulator adjusting the pulse-width of said DC power source in response to said filtered high-voltage DC signal from said feedback circuit and said low-voltage DC signal;

(g) transmitting said filtered high-voltage DC signal into a constant-current load, said constant-current load draining said small stored charge from said filtered high-voltage DC signal; and (h) transmitting said filtered high-voltage DC signal into a matrix of at least four high-voltage transistors, said matrix having electrical connections with a zero crossing detector and matrix controller, said detector having electrical connections with said reference signal and means for detecting when said wave shape of said reference signal is above and below a zero value and sending control signals to said matrix to recreate the positive and negative wave shape of said reference signal in response to said control signals and said filtered high-voltage DC signals, said matrix converting said filtered high-voltage DC signal into a low-frequency, high-voltage AC signal having a wave shape substantially replicating the wave shape of said reference signal.

13. A method for replicating a wave shape comprising the steps of:

(a) converting a low-frequency, low-voltage AC reference signal into a low-voltage DC signal;

(b) transmitting said low-voltage DC signal into a pulse-width modulator, said pulse-width modulator varying the pulse-width of a DC power source into a pulsed DC signal;

(c) transmitting said pulsed DC signal into a transformer, said transformer converting said pulsed DC signal into a high-switching frequency, high-voltage AC signal;

(d) transmitting said high-frequency, high-voltage AC signal into four ultra-fast diode rectifiers for converting said high-frequency, high-voltage AC signal into a high-voltage DC signal;

(e) transmitting said high-voltage DC signal into a filter, said filter having a high inductance to capacitance ratio, said filter minimizing a small stored charge while converting said high-voltage DC signal into a filtered high-voltage DC signal;

(f) transmitting said filtered high-voltage DC signal into a feedback circuit and a constant-current load, said feedback circuit transmitting said filtered high-voltage DC signal back to said pulse-width modulator, said pulse-width modulator adjusting the pulse width of said DC power source in response to said filtered high-voltage DC signal and said low-voltage signal, said constant-current load draining said stored charge from said filtered high-voltage DC signal; and (g) transmitting said drained filtered high-voltage DC signal into a matrix of at least four high-voltage transistors, said matrix having electrical connections with a zero crossing detector and matrix controller, said controller having electrical connections with said reference signal and means for detecting when said wave shape of said reference signal is above and below a zero value, said controller alternately sending control signals to said matrix to recreate the positive and negative wave shape of said reference signal in response to said control signal and said drained filtered high-voltage DC signal, said matrix converting said drained filtered high-voltage DC signal into a low-frequency, high-voltage AC signal having a wave with a shape substantially replicating the wave shape of said reference signal.

* * * * *

UNITED STATES PATENT AND TRADEMARK OFFICE
CERTIFICATE OF CORRECTION

PATENT NO. : 5,563,776
DATED     : Oct. 8, 1996
INVENTOR(S) : E. Joe Eck

It is certified that error appears in the above-indentified patent and that said Letters Patent is hereby corrected as shown below:

Column 3, line 42, "0,002μ farad" should be -- 0.002μ farad --.
Column 4, line 16, "HF-HVAC signal" should be -- HF-HV AC signal --.
Column 5, line 25, "LF-HVDC signal" should be -- LF-HV DC signal --.
Column 6, line 31, "LF-HVAC signal" should be -- LF-HV AC signal --.

Column 9, line 1, Claim 10, a "switching,mode AC wave" should be a -- switching-mode AC wave --.
Column 9, line 26, Claim 12, "high-frequency, high-voltage signal" should be -- high-frequency, high-voltage AC signal--.
Column 10, line 17, Claim 13, "high-switching frequency, high-voltage AC signal" should be -- high-frequency, high-voltage AC signal --.
Column 10, line 47, Claim 13, "control signal" should be -- control signals --.

Signed and Sealed this

Twenty-first Day of January, 1997

Attest:

BRUCE LEHMAN

*Attesting Officer*     *Commissioner of Patents and Trademarks*